(12) United States Patent
Lucas et al.

(10) Patent No.: US 12,441,307 B2
(45) Date of Patent: Oct. 14, 2025

(54) OBSTRUCTION DETECTION SYSTEM

(71) Applicant: Xorail, Inc., Berwick, PA (US)

(72) Inventors: James Lucas, Wilmerding, PA (US); Brad Von Tersch, Wilmerding, PA (US); Mike Kirchner, Wilmerding, PA (US)

(73) Assignee: Xorail, Inc.

( * ) Notice: Subject to any disclaimer, the term of this patent is extended or adjusted under 35 U.S.C. 154(b) by 292 days.

(21) Appl. No.: 17/890,192

(22) Filed: Aug. 17, 2022

(65) Prior Publication Data
US 2022/0398924 A1 Dec. 15, 2022

Related U.S. Application Data

(63) Continuation-in-part of application No. 16/733,465, filed on Jan. 3, 2020, now Pat. No. 11,468,766.

(51) Int. Cl.
B60W 30/095 (2012.01)
B60W 30/08 (2012.01)
B60W 30/09 (2012.01)
B60W 60/00 (2020.01)
G06N 20/00 (2019.01)
(Continued)

(52) U.S. Cl.
CPC ........ B60W 30/0956 (2013.01); B60W 30/08 (2013.01); B60W 30/09 (2013.01); B60W 30/095 (2013.01); B60W 30/0953 (2013.01); B60W 60/0027 (2020.02); G06V 20/54 (2022.01); G08G 1/052 (2013.01); G08G 1/056 (2013.01); G08G 1/096725 (2013.01); G08G 1/096783 (2013.01); G08G 1/164 (2013.01);
(Continued)

(58) Field of Classification Search
CPC .. B60W 30/0956; B60W 30/08; B60W 30/09; B60W 30/095; B60W 30/0953; B60W 60/0027; G06N 20/00; G06V 20/54; G06V 2201/08; G08G 1/052; G08G 1/056; G08G 1/096725; G08G 1/096783; G08G 1/164; G08G 1/166
See application file for complete search history.

(56) References Cited

U.S. PATENT DOCUMENTS 5,554,982 A 9/1996 Shirkey
5,825,412 A * 10/1998 Hobson .................... H04N 7/18
348/148
(Continued)

FOREIGN PATENT DOCUMENTS

KR 20180113447 A * 10/2018 ............. G08G 1/164

OTHER PUBLICATIONS

Translation of KR-20180113447-A, 20 pages (Year: 2018).*
(Continued)

Primary Examiner — Dale W Hilgendorf
(74) Attorney, Agent, or Firm — K&L Gates LLP

(57) ABSTRACT

Systems and methods for detecting or predicting potential collisions between vehicles are provided. The systems and methods may receive sensor output indicative of a location, a heading, and/or a moving speed of a first vehicle and/or a second vehicle. The systems and methods may predict a collision between the vehicles at an intersection between routes based on the received sensor output. The systems and methods may change movement of the first vehicle and/or the second vehicle responsive to predicting the collision.

18 Claims, 4 Drawing Sheets

(51) Int. Cl.
*G06V 20/54* (2022.01)
*G08G 1/052* (2006.01)
*G08G 1/056* (2006.01)
*G08G 1/0967* (2006.01)
*G08G 1/16* (2006.01)

(52) U.S. Cl.
CPC ............ *G08G 1/166* (2013.01); *G06N 20/00* (2019.01); *G06V 2201/08* (2022.01)

(56) References Cited

U.S. PATENT DOCUMENTS

| | | | |
|---|---|---|---|
| 6,179,252 B1 | 1/2001 | Roop | |
| 6,345,233 B1 | 2/2002 | Erick | |
| 6,996,461 B2 | 2/2006 | Kane | |
| 9,248,834 B1* | 2/2016 | Ferguson | B60W 30/09 |
| 9,381,916 B1* | 7/2016 | Zhu | B60W 30/0956 |
| 10,235,882 B1* | 3/2019 | Aoude | G08G 1/164 |
| 10,803,746 B2* | 10/2020 | Bai | G08G 1/164 |
| 11,468,766 B2* | 10/2022 | Lucas | G08G 1/096791 |
| 2004/0015275 A1 | 1/2004 | Herzog | |
| 2004/0236482 A1 | 11/2004 | Kane | |
| 2007/0040070 A1* | 2/2007 | Stevenson | B61L 29/30 246/122 R |
| 2008/0033605 A1 | 2/2008 | Daum | |
| 2008/0169939 A1* | 7/2008 | Dickens | G08G 1/02 340/910 |
| 2011/0084176 A1 | 4/2011 | Reichelt | |
| 2012/0182140 A1* | 7/2012 | Kumabe | G08G 1/161 340/435 |
| 2012/0248261 A1 | 10/2012 | Nichter | |
| 2013/0018534 A1 | 1/2013 | Hilleary | |
| 2013/0278442 A1* | 10/2013 | Rubin | H04W 4/06 340/905 |
| 2014/0032049 A1* | 1/2014 | Moshchuk | G08G 1/166 701/42 |
| 2014/0166820 A1 | 6/2014 | Hilleary | |
| 2014/0218482 A1* | 8/2014 | Prince | B61L 29/32 348/47 |
| 2014/0361125 A1 | 12/2014 | Fries | |
| 2014/0367526 A1 | 12/2014 | Steffen, II | |
| 2016/0097849 A1* | 4/2016 | Nichols | G08G 1/0175 342/107 |
| 2016/0155334 A1* | 6/2016 | Jansson | G08G 1/07 340/906 |
| 2016/0189552 A1* | 6/2016 | Hilleary | B61L 29/22 246/125 |
| 2016/0200334 A1* | 7/2016 | Hilleary | G08G 1/04 246/218 |
| 2018/0170372 A1* | 6/2018 | Takamatsu | G08G 1/096725 |
| 2018/0222506 A1* | 8/2018 | Kranz | B61L 29/224 |
| 2019/0145791 A1 | 5/2019 | Rempel et al. | |
| 2019/0146520 A1 | 5/2019 | Naithani et al. | |
| 2019/0248392 A1* | 8/2019 | Bar-Tal | B61L 15/009 |
| 2019/0259282 A1* | 8/2019 | Ji | G08G 1/166 |
| 2020/0327371 A1* | 10/2020 | Sharma | H04L 67/34 |
| 2021/0201664 A1* | 7/2021 | Mcquillen | G08G 1/091 |

OTHER PUBLICATIONS

First Examination Report mailed Oct. 11, 2023 for corresponding Australian Application No. 2022252739 (3 pages).
Examination Report mailed Feb. 7, 2024 for corresponding Australian Application No. 2022252739 (6 pages).

* cited by examiner

OBSTRUCTION DETECTION SYSTEM

CROSS-REFERENCE TO RELATED APPLICATIONS

This application is a continuation-in-part and claims priority to U.S. patent application Ser. No. 16/733,465 (filed 3 Jan. 2020), U.S. Pat. No. 11,468,766, issued Oct. 11, 2022, the entire disclosure of which is incorporated herein by reference.

BACKGROUND

Technical Field

The subject matter described relates to systems and methods that monitor route crossings or other locations to determine whether obstructions exist and that can warn approaching vehicles of the obstructions.

Discussion of Art

Many vehicles travel on routes that cross each other and/or that can have several vehicles moving near each other. For example, rail vehicles travel along tracks that may intersect with a road at a crossing. Another vehicle (e.g., an automobile) may obstruct the crossing by being in the crossing in a location that would result in a collision with the rail vehicle if the rail vehicle were to travel through the crossing. For example, the automobile may become trapped between lowered gates or the automobile may be experiencing failures resulting in an inability of the automobile to move out of the crossing.

Some known systems detect the presence of an automobile in a crossing using radar and provide warnings to railroad personnel. But, these warnings may be missed by the personnel. Further, depending on the distance of a vehicle to the crossing, there may be a relatively large number of false positives that may inhibit efficiency of a crossing detection system or its use.

BRIEF DESCRIPTION

In one example, a method (e.g., for detecting or predicting potential collisions) is provided that may include receiving sensor output indicative of one or more of a location, a heading, or a moving speed of one or more of a first vehicle or a second vehicle, predicting a collision between the first vehicle and the second vehicle at an intersection between two or more routes based on the sensor output that is received, and changing movement of the one or more of the first vehicle or the second vehicle responsive to the collision that is predicted.

In one example, a collision detection system is provided that may include a controller that receive sensor output indicative of one or more of a location, a heading, or a moving speed of one or more of a first vehicle or a second vehicle. The controller may predict a collision between the first vehicle and the second vehicle at an intersection between two or more routes based on the sensor output that is received, and may change movement of the one or more of the first vehicle or the second vehicle responsive to the collision that is predicted.

In one example, a detection system may include a controller that receives sensor output indicative of one or more of a location, a heading, or a moving speed of a first automobile and a second automobile. The controller may predict a collision between the first automobile and the second automobile at an intersection between two or more roads based on the sensor output that is received and using an artificial intelligence or machine learning model. The controller may autonomously change movement of the one or more of the first automobile or the second automobile responsive to the collision that is predicted.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
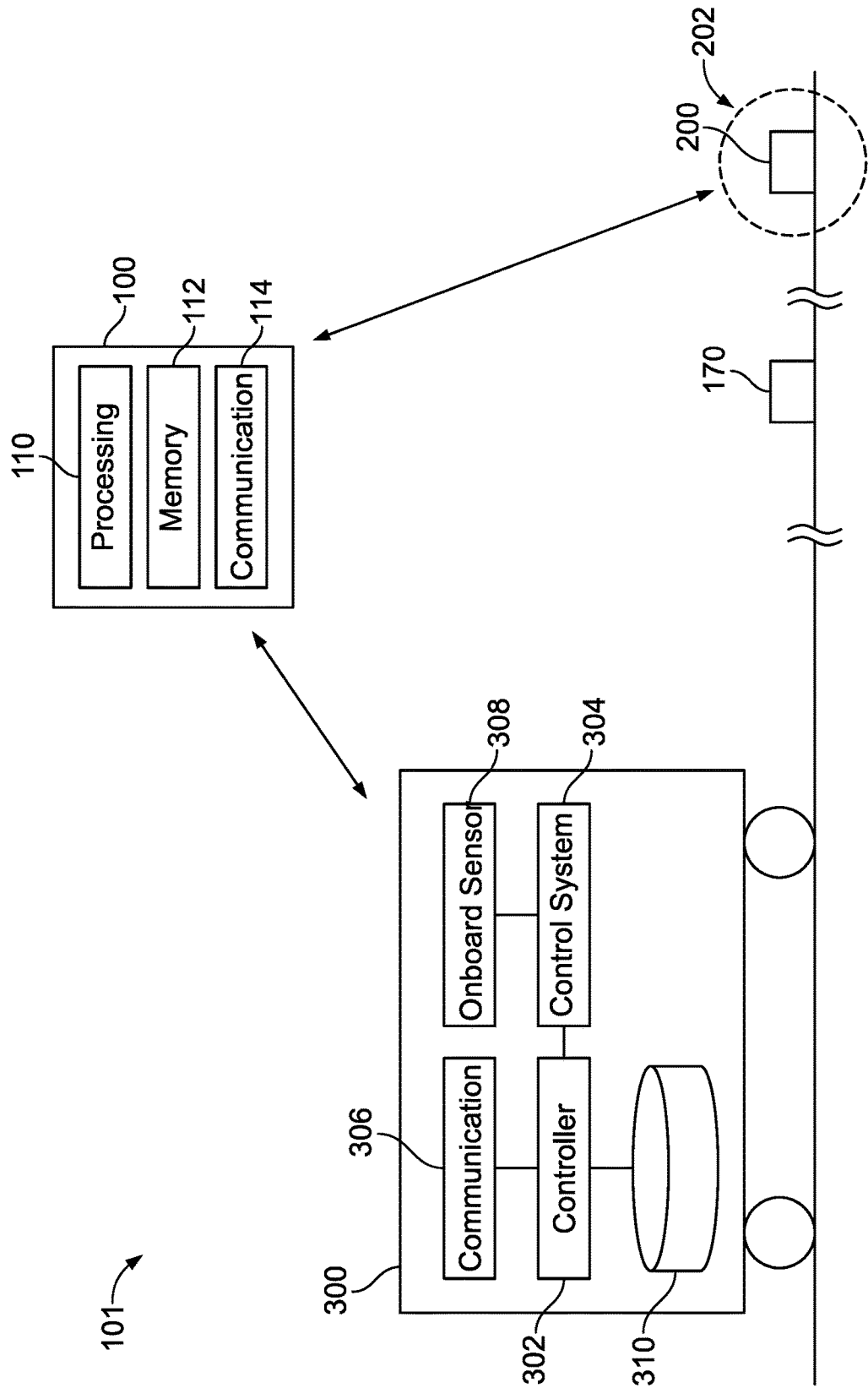
FIG. 1 illustrates a block schematic diagram of a network that includes a obstruction alert system, a wayside detection system, and a vehicle.

Embodiments of the subject matter described herein relate to systems and methods that determine whether an obstruction is present in an intersection between routes and that can notify vehicles approaching the crossing of the obstruction so that the vehicles can change movement to avoid colliding with the obstruction. Additional discussion regarding detection of obstructions may be found in U.S. patent application Ser. No. 16/600,147, entitled "Crossing Obstruction Detection System" and filed Oct. 11, 2019, the entire content of which is hereby incorporated by reference.

In various embodiments, an onboard system may determine location (e.g., latitude and longitude) of a vehicle along with speed, and provide the location and speed to a control system (e.g., of a back office system) at a predetermined rate (e.g., 1 Hz). The control system may then calculate the amount of time for any vehicles in a network associated with the control system to arrive at any crossings identified as obstructed. In various embodiments, an escalating scale of alerts may be provided to a dispatcher and/or operator based on the amount of time a particular object has obstructed a crossing and the estimated time of arrival of the vehicle to the crossing.

In one example, the systems and methods integrate the detection of the obstruction with a centralized control system that warns vehicles equipped with positive train control systems, and the onboard positive train control systems can automatically apply brakes to slow or stop movement of the vehicle before the vehicle collides with the obstruction. The systems and methods described herein can be used with rail vehicle systems (e.g., a train) equipped with an onboard positive train control systems. It may be noted that the systems and methods described herein may also be used with other control systems, such as negative control systems. Stationary wayside cameras can detect the presence of a vehicle (e.g., an automobile) within a crossing between a track and another type of route (e.g., a road), and alerts and/or commands provided to the vehicle as appropriate.

Not all embodiments described herein are limited to rail vehicle systems, positive train control systems, cameras, crossings between routes, slowing or stopping as a responsive action, and/or automobiles as obstructions in a crossing. For example, one or more embodiments of the detection systems and methods described herein can be used in connection with other types of vehicles, such as automobiles, trucks, buses, mining vehicles, marine vessels, aircraft, agricultural vehicles, or the like. The systems and methods can warn these other types of vehicles of obstructions to prevent collisions between the vehicles and the obstructions. As another example, one or more embodiments can be used with vehicle control systems other than positive train control systems to change movement of a vehicle responsive to receiving a warning of an obstruction.

Additionally, one or more embodiments may use sensors other than cameras to detect an obstruction. For example, radar systems, lidar systems, weight scales, or the like, may be used to detect obstructions. The obstructions may be detected in locations other than crossings (e.g., intersections) between two or more routes. For example, one or more embodiments described herein may be used to detect an obstruction along a route in a location that is not a crossing between the route and at least one other route. The onboard control systems may implement a responsive action other than slowing or stopping movement of the vehicle responsive to receiving a warning of an obstruction. For example, the onboard control systems may change which route the vehicle is traveling on to avoid colliding with the obstruction. The obstructions that are detected may be objects other than automobiles.

One or more embodiments may warn vehicles when an obstruction will or may exist, but that does not yet exist. For example, the locations, headings, and/or speeds of vehicles can be examined and used to predict when one or more vehicles will be present in an intersection (even though no vehicle may currently be in the intersection). The systems can warn other vehicles of the potential presence of a vehicle in the intersection at the times that the other vehicles may be in the intersection. The vehicles approaching the intersection may then slow or stop, or change direction, to avoid a collision in the intersection.

FIG. 1 illustrates a block schematic diagram of a network 101 that includes an obstruction alert system 100 (e.g., a crossing obstruction alert system), a detection system 200 (e.g., wayside detection system), and a vehicle 300. It may be noted that in the illustrated example, the obstruction alert system is depicted as separate from the detection system and vehicle; however, in some examples, one or more aspects of the obstruction alert system (e.g., optical sensor) and/or one or more aspects of the vehicle (e.g., position sensor) may be included as part of the obstruction alert system. Also, in the depicted example, the obstruction alert system is depicted as being disposed off-board the vehicle; however, in some examples, the obstruction alert system may be disposed on-board the vehicle. Generally, in the illustrated example, the detection system (e.g., an optical sensor of the detection system) and a position sensor 308 of the vehicle provide information to the obstruction alert system, which determines a presence or absence of an alert state and performs (e.g., directs performance of) a responsive activity responsive to determination of the presence of an alert state.

Figure 2:
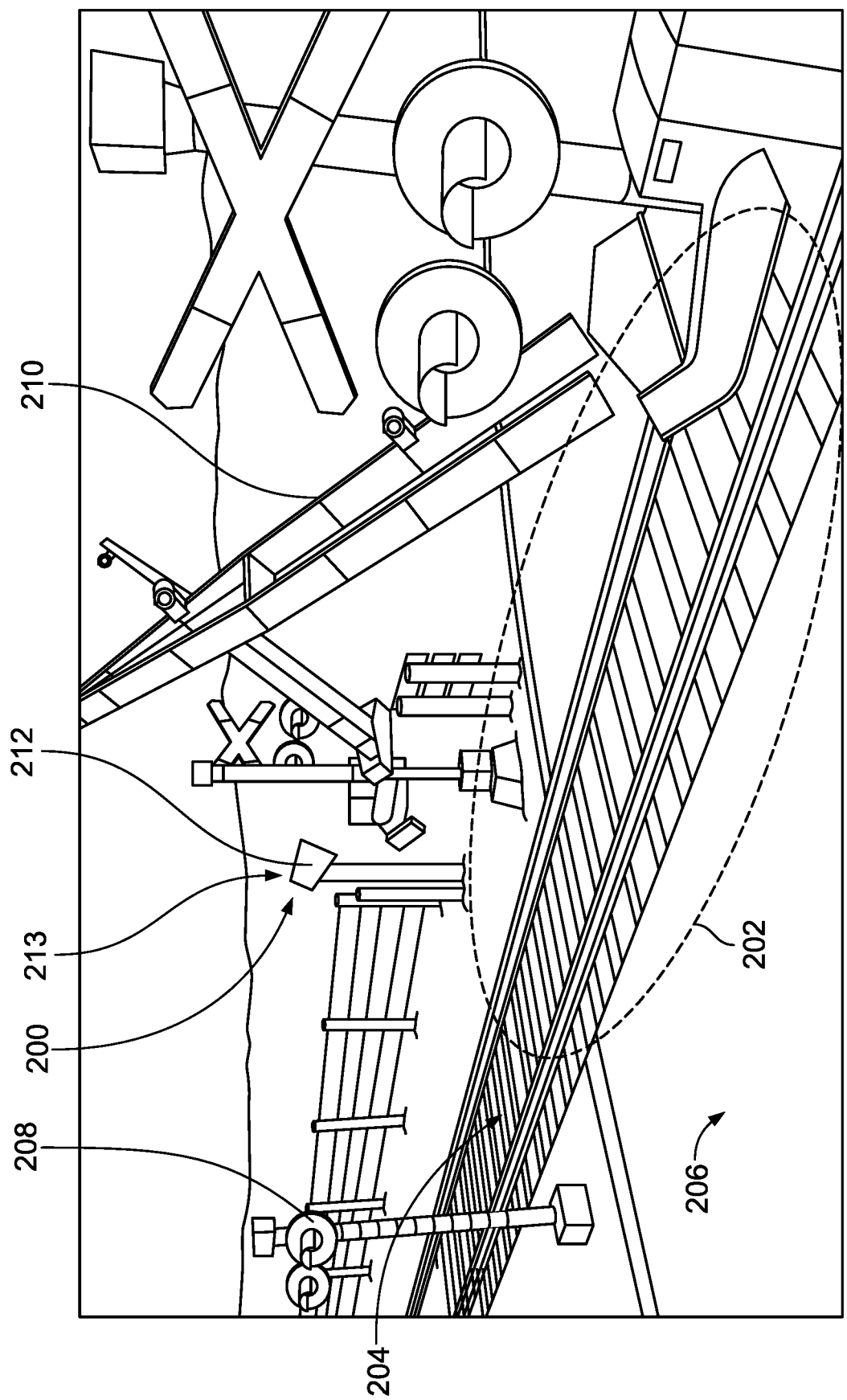
FIG. 2 illustrates an example crossing of the network of FIG. 1.

An example detection system 200 and related aspects is illustrated in greater detail in FIG. 2. As discussed herein, an optical sensor 212 is disposed proximate a crossing of a route traversed by the vehicle, and is configured to obtain crossing obstruction information indicating a presence of an obstruction to the crossing.

The detection system may be disposed at a crossing or intersection 202 between two or more routes 204, 206. The crossing can be an intersection between the routes. The crossing can include one or more signals 208, gates 210, or the like. Optionally, the crossing does not include a signal or gate. The routes can be tracks, roads, or the like, on which vehicles travel. In one example, the intersection may be between routes of the same type of route (e.g., an intersection between tracks, an intersection between roads, an intersection between mining vehicle routes, etc.). In another example, the intersection may be between routes of different types of routes (e.g., an intersection between a track and a road). The signals may include lights that are activated to warn vehicles traveling on one route (e.g., the road) of a vehicle approaching on another route (e.g., the track). The gates may be lowered to impede entry of a vehicle (e.g., automobile) into the crossing when another vehicle (e.g., a train) is approaching the crossing.

The detection system includes the optical sensor which may a wayside camera assembly 213 in the illustrated example. The camera assembly may generate image data of the crossing. The camera assembly can be stationary in that the camera assembly does not move while the vehicles moving on the routes pass by the camera assembly. It may be noted that in other embodiments, the camera assembly (and/or other sensors discussed herein) may be mobile. For example, the camera assembly may be mounted on another vehicle, or as another example, the camera assembly may be mounted on a drone. The camera assembly includes one or more cameras having a field of view that includes the routes and/or crossing. The cameras can output data signals indicative of one or more characteristics of the routes and/or crossings. For example, the cameras can generate image or video data that is analyzed (e.g., by a controller of the camera assembly) to determine whether the image or video data indicate that a vehicle is obstructing the crossing. This controller can generate a warning signal responsive to detecting the presence of an obstruction in the crossing based on the image or video data. This warning signal optionally can be referred to as a warning bulletin. The warning signal can be communicated to a centralized location, such as a back-office server, that is off-board the vehicles traveling on the routes. The warning signal can be received by the centralized location. The centralized location can include a controller (e.g., as part of the obstruction alert system) that determines which vehicles are near and/or approaching the crossing, and/or how long a vehicle or other obstruction has been at a crossing. The controller of the centralized location (e.g., a processing unit 110 of the obstruction alert system) can then, as discussed herein, determine the appropriateness of further action, and perform a responsive activity (e.g., send the same or different warning signal (e.g., wirelessly) to the vehicles that are near and/or approaching the crossing to warn these vehicles of the detected obstruction). Onboard control systems of the vehicles can apply brakes or otherwise change movement of the vehicles to slow or stop movement of the vehicles before the vehicles collide with the obstruction.

Figure 3:
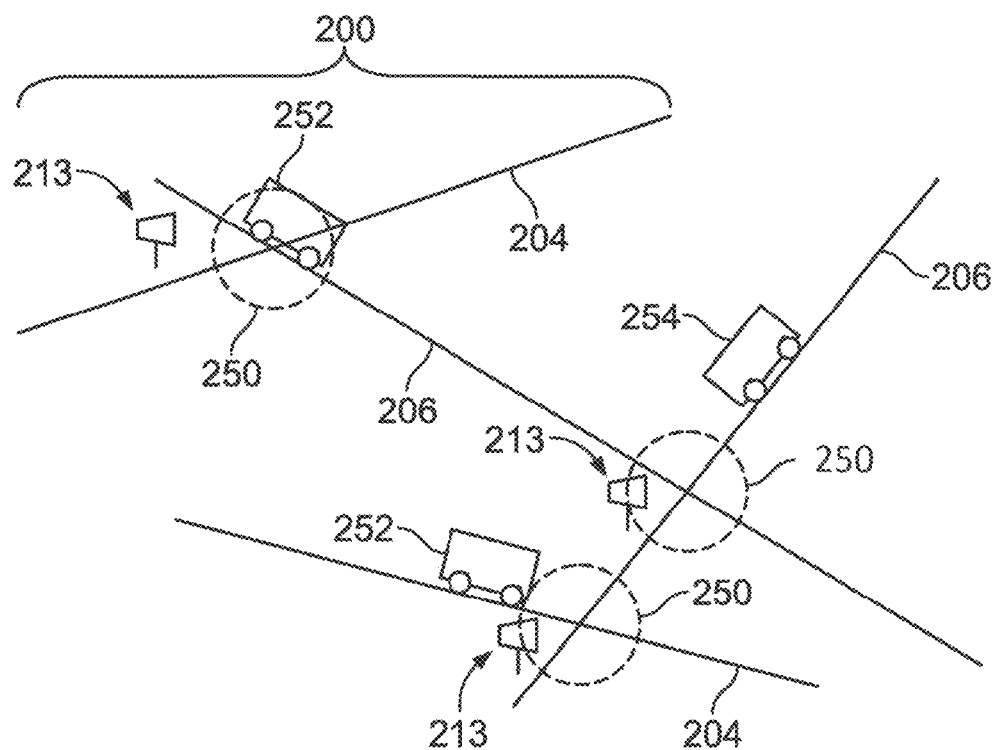
FIG. 3 illustrates a plurality of wayside camera assemblies located at several different crossings between routes.

While only one crossing is shown in FIG. 2, the detection system may be used with several crossings. For example, FIG. 3 illustrates the detection system communicating with several wayside assemblies located at several different crossings between routes. Each of the wayside assemblies can monitor characteristics of a different segment or portion of a route for an obstruction. For example, each wayside camera assembly can output and examine image and/or video data of a different crossing to determine whether an obstruction is present in the crossing. The wayside camera assembly can examine the characteristics of the route (e.g., the presence of an obstruction within a designated monitored area 250). This monitored area can correspond to a defined or fixed distance from the center of the crossing, can correspond to the field of view of the camera assembly, or can otherwise be defined by an operator. If the data output by the camera assembly indicates that an obstruction is present within the monitored area, then the camera assembly can determine that an obstruction is present.

The obstruction that is detected can be the presence of a vehicle 252 and/or 254 within the monitored area. In one embodiment, the vehicle 252 can represent an automobile while the vehicle 254 can represent a rail vehicle, such as a train, locomotive, or the like. But, not all embodiments of the inventive subject matter described herein are limited to automobiles and/or rail vehicles, as described above. The vehicles can represent other vehicles, such as both being automobiles or one or more of the vehicles representing buses, trucks, agricultural vehicles, mining vehicles, aircraft (e.g., manned or unmanned aircraft that may travel individually or in a group, such as one or more swarms), marine vessels, or the like. The routes can represent tracks, roads, waterways, mining paths or tunnels, airway paths, or the like.

Figure 4:
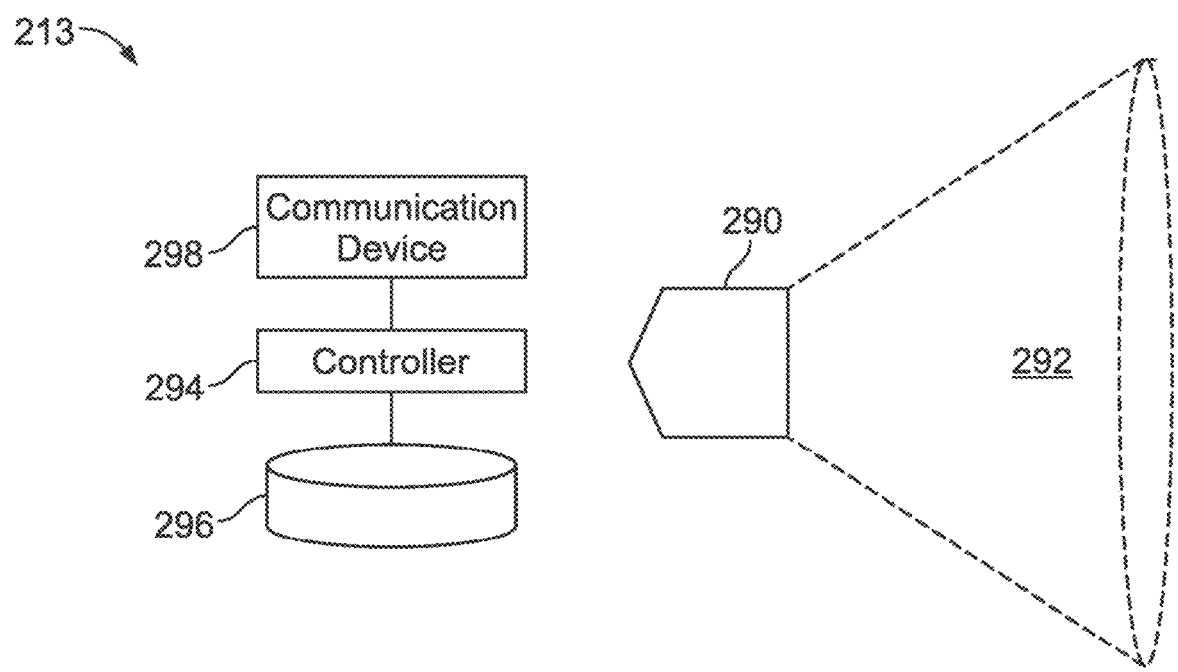
FIG. 4 illustrates one example of a wayside camera assembly for the network of FIG. 1.

With continued reference to the wayside detection system shown in FIG. 3, FIG. 4 illustrates one example of the wayside assembly shown in FIG. 2. The wayside assembly includes one or more sensors 290 that monitor one or more characteristics of the monitored area of the route. The sensor can represent a camera in one embodiment that outputs static images and/or videos within a field of view 292 of the camera. A controller 294 of the assembly receives the data output by the sensor and examines the data to determine whether an obstruction is present within the monitored area based on the data. The controller represents hardware circuitry that includes and/or is connected with one or more processors (e.g., one or more microprocessors, integrated circuits, microcontrollers, field programmable gate arrays, etc.) that perform operations described in connection with the camera assembly. Optionally, the wayside assembly may include one or more additional sensors or a sensor in place of the camera or optical sensor. For example, the wayside assembly may include a LiDAR sensor, a radar system, strain gauges, load cells, etc., that detects the presence of a vehicle in the intersection or crossing.

The controller can receive the sensor data and examine the sensor data to determine whether an obstruction is present. For example, with respect to image and/or video data, the controller can examine characteristics of pixels in the data to determine whether an obstruction (e.g., a vehicle) has appeared in the field of view of the camera and remain in the field of view for at least a designated period of time (e.g., thirty seconds, sixty seconds, etc.). Optionally, the controller can use one or more object detection algorithms, such as selective searching (grouping pixels having similar characteristics together and determining whether the grouped pixels represent a defined object, such as a vehicle). Alternatively, another object detection algorithm may be used.

As another example, the controller can receive the sensor data and predict when a vehicle will be an obstruction in the intersection or crossing. For example, the wayside assembly having the sensor may be located away from the intersection or crossing. The sensor can detect passage of a moving vehicle and report one or more characteristics of the moving vehicle to the controller. The controller can examine the output from the sensor to predict when the vehicle will be in the intersection. For example, the sensor may sense, or the controller may determine from the sensor output, the direction that the vehicle is moving and/or how fast the vehicle is moving. The controller may know the distance between the sensor and the intersection. Based on this information, the controller can predict when the vehicle will be in the intersection. Optionally, the controller can communicate with the vehicle to receive current speeds and/or headings of the vehicle from the vehicle. The controller may perform this same prediction for one or more other vehicles heading toward the same intersection. The controller can predict whether two or more vehicles will be present in the intersection at the same time. The controller can then notify these vehicles and/or instruct the vehicles to make one or more evasive or responsive actions. For example, the controller can send signals to these vehicles and, in response to receiving these signals, one or more of the vehicles may slow down, stop movement, move onto another route that avoids the intersection or that gets the vehicle to the intersection at a sooner or later time where the predicted collision would be avoided, etc.

The controller optionally can store the sensor data in a tangible and non-transitory computer-readable storage medium (e.g., memory 296 in FIG. 4). For example, responsive to determining that the sensor data indicates that an obstruction is present within the monitored area, the controller can direct the memory to electronically and/or magnetically store the sensor data.

Responsive to determining that an obstruction is present in the monitored area, the controller of the camera assembly communicates a signal to another location (e.g., a processing unit 110 of the crossing detection system) via a communication device 298. The communication device can represent circuitry that can communicate data signals wirelessly and/or via wired connections. For example, the communication device can represent transceiving circuitry, one or more antennas, modems, or the like, that communicate (e.g., broadcast and/or transmit) a warning signal that indicates detection of an obstruction in the monitored area. This warning signal can be sent before a vehicle approaching the monitored area reaches the monitored area.

With continued reference to FIG. 1, the vehicle shown in FIG. 1 can represent one or more of the vehicles shown in FIG. 3. The depicted example vehicle is shown as a land-based vehicle, such as a rail vehicle (e.g., locomotive), but optionally can be another type of land-based vehicle or may be a vehicle that travels via waterways and/or the air. The vehicle includes a controller 302 that represents one or more processors that control movement and other operations of the vehicle. This controller can be referred to as a vehicle controller. The vehicle controller can represent an engine control unit, an onboard navigation system, or the like, that can control a propulsion system (e.g., one or more engines, motors, etc.) and/or a braking system (e.g., one or more friction brakes, air brakes, regenerative brakes, etc.) to control movement of the vehicle.

The vehicle optionally includes a control system 304 that communicates with one or more off-board control systems (e.g., the obstruction alert system and/or a system including or associated with the obstruction alert system) for limiting where and/or when the vehicle can move. For example, the control system onboard the vehicle can be referred to as a vehicle control system that can automatically apply brakes of the vehicle to slow or stop the vehicle based on warning bulletins received from the obstruction alert system. In one embodiment, the vehicle control system is an onboard component of a positive train control system that limits where and when the vehicle can move based on movement authorities, locations of other vehicles, or the like.

Communications from the crossing obstruction alert system can be received by the vehicle controller and/or vehicle control system via a communication device 306, which may also provide information from the position sensor to the crossing obstruction alert system. This communication device can include an antenna and wireless transceiving circuitry that wirelessly communicates signals with other communication devices described herein. A tangible and non-transitory computer-readable storage medium (e.g., a memory 310) of the vehicle may store locations and/or layouts of the routes, locations of the monitored areas, identities of the camera assemblies and the monitored areas examined by the camera assemblies, etc.

The vehicle control system can receive alerts, commands, or other messages sent from the crossing obstruction alert system and/or other off-board control system and can apply the brakes of the vehicle and/or control the propulsion system of the vehicle to slow or stop movement of the vehicle responsive to receiving the warning bulletin. For example, the onboard positive train control system of the vehicle can receive a message corresponding to an obstruction in a crossing. The onboard positive train control system can then warn an onboard operator to engage the brakes or can automatically apply the brakes to prevent a collision between the vehicle and the obstruction. Alternatively, the vehicle control system in some embodiments is not a positive train control system. The vehicle control system can receive the warning bulletin or signal from the off-board control system and engage the brakes or otherwise act to slow or stop movement of the vehicle.

The depicted example vehicle includes one or more position sensors 308 that determine locations and/or headings of the vehicles. The position sensor can represent a global positioning system receiver, a wireless triangulation system, a dead reckoning system, inertial sensor, speedometer, or the like, that determines locations and/or headings of the vehicle. The locations and/or headings of the vehicles can be determined by the position sensors and communicated from the vehicles to the crossing obstruction alert system.

As discussed herein, position information may be used to determine the proximity of a particular vehicle to a particular crossing associated with an obstruction. It may also be noted that position information may also be used to identify or select which vehicles among a group of vehicles should be analyzed for determining proximity information. For example, a warning signal received by the crossing obstruction alert system from the optical sensor can identify the location of the monitored area where the obstruction is detected and/or can identify the camera assembly that detected the obstruction. The locations of the camera assemblies can be associated with different monitored areas, and the crossing obstruction alert system can determine the location of the obstruction from the warning signal and/or the identity of the camera assembly that sent the warning signal. Then, the crossing obstruction alert system can determine which, if any, vehicles are sent an alert or other message or command.

In some examples, the obstruction alert system may be understood as including or incorporating the optical sensor and the position sensor. In other embodiments, the obstruction alert system may be understood as separate from the optical sensor and the position sensor and configured to receive information from the sensors. The depicted example obstruction alert system includes a processing unit 110, memory 112, and communication unit 114. The communication unit is configured to exchange messages or information with aspects of the detection system and the vehicle. For example, the communication unit may be used to receive information from the optical sensor and the position sensor, and/or to provide messages (e.g., alerts, commands, or other information) to the vehicle. In some embodiments, the obstruction alert system forms a portion of a back office server of a positive train control (PTC) system. Alternatively, the obstruction alert system may be configured as or form a part of another system that monitors movements of the vehicles to ensure safe travel of the vehicles. For example, the obstruction alert system may be a portion of or associated with a dispatch facility, a scheduling facility, or the like.

Generally, the processing unit represents one or more processors configured (e.g., programmed) to perform various tasks or activities discussed herein. For example, the depicted example processing unit is configured to obtain or receive position information (e.g., information indicating a position of the vehicle traversing a route) from the position sensor, and to receive crossing obstruction information (e.g., information indicating a presence of an obstruction to the crossing) from the optical sensor. The processing unit is also configured to determine proximity information of the vehicle 300 indicating proximity of the vehicle to the crossing using the position information. Further, the processing unit is configured to determine a presence or absence of an alert state indicating a potential of the crossing being obstructed using the crossing obstruction information and the proximity information, and perform a responsive activity responsive to a determination of the presence of the alert state.

It may be noted that, for ease and clarity of illustration, in the depicted example, the processing unit is shown as a single unit; however, in various embodiments the processing unit may be distributed among or include more than one physical unit, and may be understood as representing one or more processors. The processing unit represents hardware circuitry that includes and/or is connected with one or more processors (e.g., one or more microprocessors, integrated circuits, microcontrollers, field programmable gate arrays, etc.) that perform operations described herein. The processing unit in various embodiments stores acquired information (e.g., information regarding the location of crossings, information regarding the position of one or more vehicles, information regarding identified obstructions to one or more crossings) in a tangible and non-transitory computer-readable storage medium (e.g., memory 112). Additionally or alternatively, instructions for causing the processing unit to perform one or more tasks discussed herein may be stored in a tangible and non-transitory computer-readable storage medium (e.g., memory).

As discussed herein, the processing unit receives crossing obstruction information from the optical sensor. The crossing obstruction information may include information describing the presence of an obstruction at a crossing, the type of obstruction (e.g., car), and/or an amount of time for which the obstruction has been in the crossing. The crossing obstruction information may also include an identification of the particular crossing and/or location of the crossing for which an obstruction has been detected.

The processing unit also obtains the position information from the position sensor 308. The position information indicates a position of the vehicle traversing a particular route (e.g., a route on which a crossing is disposed along).

The position information in various embodiments is obtained from a location signal communicated from onboard the vehicle (e.g., from communication device providing information from position sensor). The position information in various examples may include information describing a current location of the vehicle (e.g., a geographical location and/or an identification of a particular route on which the vehicle is disposed) and/or movement information (e.g., a speed travelled by the vehicle and a direction of travel). In some examples, the processing unit receives position information at predetermined time intervals for a given vehicle to monitor and update a determined position of the vehicle and/or to determine a speed of the vehicle.

The processing unit is further configured (e.g., programmed) to determine proximity information of the vehicle. The proximity information indicates a proximity of the vehicle to a particular crossing (e.g., a crossing for which the processing unit has received obstruction information indicating an obstruction at the crossing). For example, the proximity information may include a distance of the vehicle from an obstructed crossing. In some embodiments, the proximity information includes an estimated time of arrival for the vehicle at the crossing. For example, the processing unit in some examples determines an estimated time of arrival using the position information and an estimated speed of the vehicle. By knowing the geographical position of the vehicle from the position information, as well as the geographical position of the crossing from archived information, a distance from the vehicle to the crossing may be determined. The distance may be in terms of a distance between coordinates of the vehicle and the crossing, or, as another example, may be in terms of mileposts or other measurements of distance along a particular route. With the distance and speed known, a time of arrival (e.g., an elapsed time from a current time) may be estimated or determined.

Various different estimated or measured speeds may be used in determining the time of arrival. In one example, the position information includes a current speed of the vehicle (e.g., as measured by a speedometer of the vehicle), which may be used to determine an estimated time of arrival. In another example, the estimated speed of the vehicle is determined using a plurality of location signals received from the vehicle. For example, by determining the locations at various times along with the amount of times between readings, the processing unit may estimate a speed of the vehicle. Additionally or alternatively, non-measured information may be used to estimate the speed. For example, a predetermined upper speed limit of the vehicle may be used. As another example, a speed of the vehicle as called for by a trip plan may be used. In some embodiments, multiple speeds may be estimated (e.g., one speed using a current measured speed, a second speed using a planned speed, a third speed using a historical average of similar vehicles on similar routes) and the highest speed used to determine the estimated time of arrival.

Next, using the crossing obstruction information and the proximity information, the processing unit determines a presence or absence of an alert state. The alert state indicates a potential of a collision at the crossing. Various factors may be considered individually or in combination to help determine the presence or absence of an alert state. For example, the closer the vehicle is to the crossing may be used to increase the likelihood of an alert state and/or increase the level of an alert state. As another example, the shorter the estimated time to arrival may be used to increase the likelihood of an alert state and/or increase the level of an alert state. As one more example, the longer amount of time that an obstruction has remained in the crossing may be used to increase the likelihood of an alert state and/or increase the level of an alert state. For example, in some embodiments, the alert state indicates that the vehicle is within a threshold time (or distance) for which one or more alerts are appropriate. Accordingly, alerts or other messages or commands may be sent when appropriate, but false or unnecessary alarms for crossing located a sufficient distance away may be avoided. Responsive to a determination of the presence of the alert state, the processing unit performs a responsive activity. If no alert state is determined for a current position of a vehicle, no immediate action may be taken, but the position of the vehicle may be periodically updated and the estimated arrival time updated and monitored, with an alert or other responsive step taken subsequently as appropriate based on the updated and monitored position of the vehicle.

Various types of responsive actions may be taken in different embodiments. For example, an alert or other message may be sent to the vehicle for review and/or implementation by an operator. As another example, a signal 170 may be disposed along the route, and the responsive activity may include operating the signal. For instance, the signal may be configured to provide a visual display to an operator of the passing vehicle, and the processing unit may send a control signal to the signal to display an appropriate warning. As another example, the signal may be associated with a switch, and the processing unit may send a control signal to the signal to operate the switch and transfer the vehicle to a different track for which there is no upcoming obstructed crossing. As one more example, the processing unit may perform a responsive action of sending a control signal to the vehicle that causes a change in the operation of the vehicle (e.g., reduction of throttle, application of brakes). In some examples, the responsive activity includes transmitting a signal to the vehicle that over-rides a current operation of the vehicle.

It may be noted that the alert state may include a variety of alert levels. For example, the processing unit may determine an alert level using the proximity information and the crossing obstruction information responsive to determining the presence of an alert state. The alert level may be selected from a group of different hierarchically-ranked alert levels. For example, a higher or more immediate alert level may be selected based on a relatively shorter estimated arrival time and/or a relatively longer duration of obstruction, while a lower or less immediate alert level may be selected based on a relatively longer estimated arrival time and/or a relatively shorter duration of obstruction.

Further, the responsive activity may be selected by the processing unit from different hierarchically-ranked remedial activities corresponding to the hierarchically ranked alert levels. In one example, for a first, lowest level alert, an informational message may be sent to an operator. The informational message, for example, may identify an upcoming crossing that is obstructed along with a distance to the crossing or estimated time of arrival. For a second, intermediate level alert, a command message may be sent, instructing the operator to perform one or more steps to slow the vehicle and/or alter a course of the vehicle. For a third, higher level alert, a command signal may be sent to the vehicle to autonomously implement a corrective action to slow the vehicle and/or alter a course of the vehicle without operator intervention. For example, an alert level may represent a risk of collision, with responsive activities selected as appropriate for the level of risk of collision. For example, if an expected risk of collision is 100%, then full braking may be automatically implemented, or the vehicle may be diverted to another route. As another example, if an expected risk of collision is 20%, a dispatcher or operator may be ordered to consider additional information (e.g., information on a monitor) and decide on an action.

Figure 5:
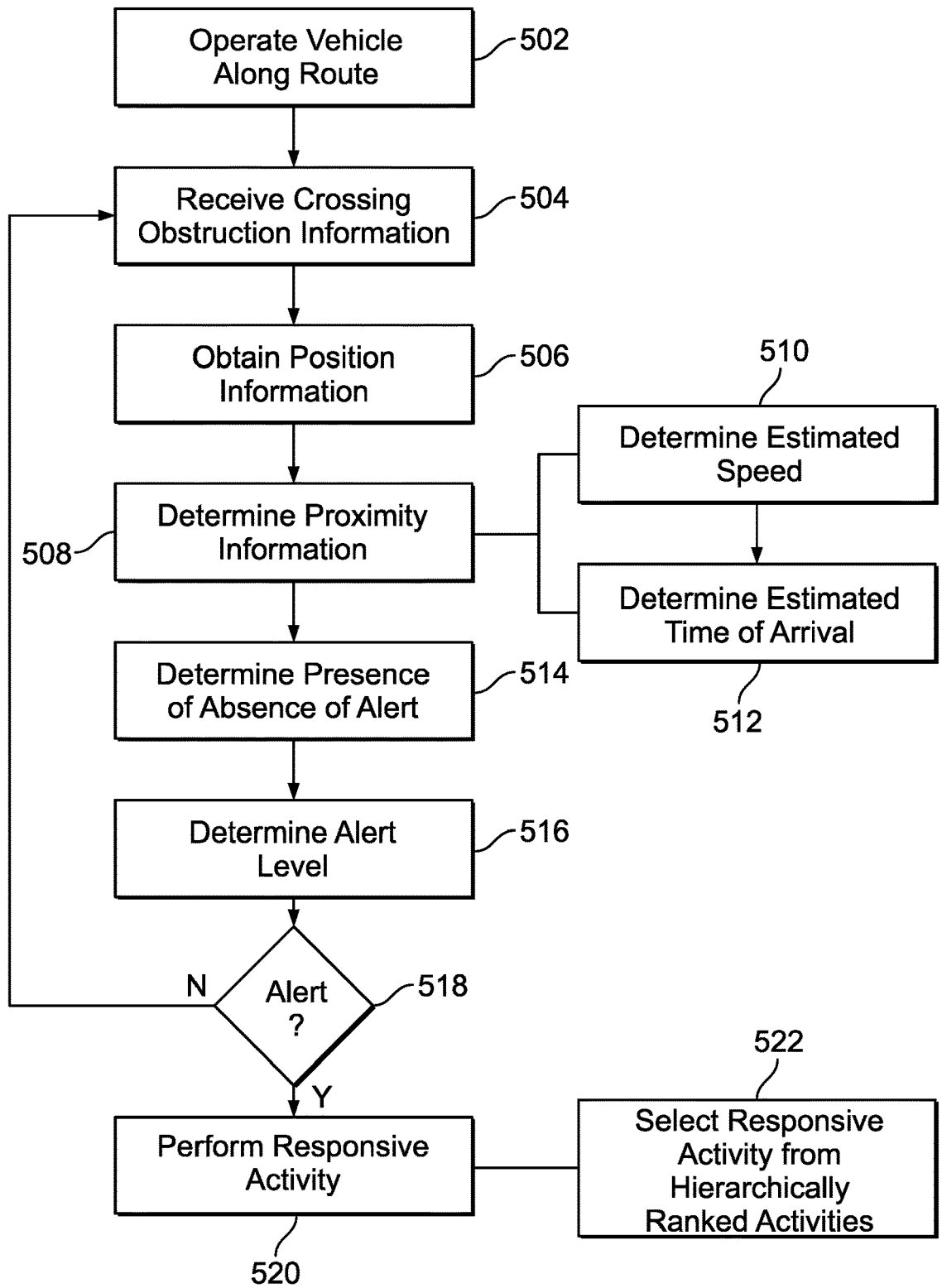
FIG. 5 illustrates a flowchart of one example of a method for detecting an obstruction of a route.

FIG. 5 illustrates a flowchart of one example of a method 500. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware (e.g., one or more aspects of the processing unit) to perform one or more operations described herein.

At step 502, a vehicle is operated to perform a mission along a route. At step 504, during performance of the mission of the vehicle, crossing obstruction information is received from an optical sensor disposed proximate a crossing of a route traversed by a vehicle. One or more crossings may be monitored by corresponding optical sensors, and crossing obstruction information sent from any optical sensors that detect an obstruction. The crossing obstruction information indicates a presence of an obstruction to the crossing. The crossing obstruction information in various examples includes an identification (e.g., by location) of the particular crossing that is obstructed, the length of time the crossing has been obstructed, and/or the type of obstruction. The crossing obstruction information may be received by a control system (e.g., crossing obstruction alert system) that is disposed off-board the vehicle in some embodiments, and on-board in others. It may be noted that the in the illustrated example relates to obstructions at crossing; however, other embodiments may relate to other types of obstructions additionally or alternatively to crossing obstructions.

At step 506, position information is obtained (e.g., by the same control system that received the crossing obstruction information). The position information indicates a position of the vehicle as it traverses the route. The position information in various examples indicates a geographic position of the vehicle, a position of the vehicle with respect to predetermined route intervals (e.g., mileposts), and/or a speed and direction of the vehicle. As one example, the position information may be sent from the vehicle (e.g., periodically), or as another example, the position information may be sent from the vehicle pursuant to a request (e.g., from processing unit) after receipt of crossing obstruction information.

At step 508, proximity information of the vehicle is determined (e.g., by the control system receiving the position and crossing obstruction information). The proximity information indicates a proximity of the vehicle to the crossing, and may be determined using the position information. The proximity information may be expressed in terms of distance and/or time from the obstructed crossing. For example, in the illustrated example, at step 510, an estimated speed of the vehicle is determined, and, at step 512, an estimated time of arrival for the vehicle at the obstructed crossing is determined using the position information (e.g., geographic location) and the estimated speed of the vehicle. In various examples, the speed of the vehicle may be part of the received position information; may be estimated from a predetermined trip plan, average speed, or permitted speed limit; or may be determined from multiple location readings over known periods of time.

At step 514, the presence or absence of an alert state indicating a potential of the crossing being obstructed (e.g., at an estimated time of arrival at the crossing by the vehicle) is determined using the crossing obstruction information and the proximity information. In the illustrated example, responsive to the determination of an alert state, an alert level is determined at step 516. The alert level is determined using the proximity information and the crossing obstruction information. In some examples, the alert level is selected from different hierarchically-ranked alert levels as discussed herein.

At step 518, it is determined if an alert state has been identified. If there is no alert state, the depicted method returns to step 504 to obtain updated crossing obstruction information and position information to monitor the mission for upcoming potential alert states. If there is an alert state, at step 520, responsive to the determination of the presence of the alert state, a responsive activity is performed. The responsive activity may include, for example, sending an alert to the vehicle (e.g., an operator of the vehicle) and/or sending a command signal to the vehicle altering operation of the vehicle (e.g., applying brakes and/or reducing throttle). Alternatively or additionally, the responsive activity may include operating a signal disposed along the route associated with the crossing, and/or over-riding a current operation of the vehicle (e.g., as performed by an operator)

In the illustrated example, at step 522, the responsive activity is selected from different hierarchically ranked remedial activities corresponding to the alert levels discussed in connection with step 516.

In one embodiment, the detection system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the detection system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a current location, heading, and/or moving speed of each vehicle), and use a model that associates different combinations of locations, headings, and/or moving speeds with different responsive actions and/or likelihoods of collisions at intersections. The controller can use this model to select a responsive action and/or likelihood of collision, and then provide an output (e.g., the selected responsive action and/or likelihood of collision calculated using the model). The controller may receive additional input of the result of implementing the responsive action that indicates whether the machine-selected responsive action provided a desirable outcome or not (e.g., by avoiding a collision or when the likelihood of collision indicates a low likelihood of collision when a collision does, in fact, occur). Based on this additional input, the controller can change the model, such as by changing which responsive action would be selected and/or the likelihood of collision that is calculated when a similar or identical combination of location, heading, and/or moving speed is received in the iteration of using the model. The controller can then use the changed or updated model again to select a responsive action and/or calculate a likelihood of confusion, receive feedback on the selected responsive action or whether a collision actually occurs, change or update the model again, etc., in additional iterations to repeatedly improve or change the model using artificial intelligence or machine learning.

In one example, a method (e.g., for detecting or predicting potential collisions) is provided that may include receiving sensor output indicative of one or more of a location, a heading, or a moving speed of one or more of a first vehicle or a second vehicle, predicting a collision between the first vehicle and the second vehicle at an intersection between two or more routes based on the sensor output that is received, and changing movement of the one or more of the first vehicle or the second vehicle responsive to the collision that is predicted.

The sensor output that is received may include optical data output by one or more optical sensors disposed at the intersection between the two or more routes and/or disposed away from the intersection between the two or more routes. The first and second vehicles may be the same type of vehicle or may be different types of vehicles. The movement of the first and/or second vehicle may be changed autonomously by communicating a signal to the one or more of the first vehicle or the second vehicle. The sensor output may be received from one or more non-optical sensors. The collision may be predicted by calculating a likelihood of collision using an artificial intelligence or machine learning model.

In one example, a collision detection system is provided that may include a controller that receive sensor output indicative of one or more of a location, a heading, or a moving speed of one or more of a first vehicle or a second vehicle. The controller may predict a collision between the first vehicle and the second vehicle at an intersection between two or more routes based on the sensor output that is received, and may change movement of the one or more of the first vehicle or the second vehicle responsive to the collision that is predicted.

The controller may receive the sensor output by receiving optical data output by one or more optical sensors disposed at the intersection between the two or more routes. The controller may receive the sensor output by receiving optical data output by one or more optical sensors disposed away from the intersection between the two or more routes. The first vehicle and the second vehicle may be the same type of vehicle or may be different types of vehicles. The controller may autonomously change the movement of the one or more of the first vehicle or the second vehicle by communicating a signal to the one or more of the first vehicle or the second vehicle. The controller may receive the sensor output from one or more non-optical sensors. The controller may predict the collision by calculating a likelihood of collision using an artificial intelligence or machine learning model.

In one example, a detection system may include a controller that receives sensor output indicative of one or more of a location, a heading, or a moving speed of a first automobile and a second automobile. The controller may predict a collision between the first automobile and the second automobile at an intersection between two or more roads based on the sensor output that is received and using an artificial intelligence or machine learning model. The controller may autonomously change movement of the one or more of the first automobile or the second automobile responsive to the collision that is predicted.

The controller may receive the sensor output by receiving optical data output by one or more optical sensors disposed at the intersection between the two or more routes. The controller may autonomously change the movement of the one or more of the first vehicle or the second vehicle by communicating a signal to the one or more of the first vehicle or the second vehicle. The controller may receive the sensor output from one or more non-optical sensors.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving sensor output indicative of one or more of a location, a heading, or a moving speed of one or more of a first vehicle or a second vehicle;
   predicting a collision between the first vehicle and the second vehicle at an intersection between two or more routes based on the sensor output that is received by calculating a likelihood of collision using an artificial intelligence or machine learning model;
   communicating a signal to the one or more of the first vehicle or the second vehicle to change movement of the one or more of the first vehicle or the second vehicle, based on hierarchically-ranked alert levels corresponding to hierarchically ranked remedial activities, responsive to the collision that is predicted;
   receiving an input of a result of changing the movement of the one or more of the first vehicle or the second vehicle that indicates whether a desirable outcome is achieved or not, wherein the desirable outcome comprises that the collision does not actually occur; and
   updating the artificial intelligence or machine learning model based on the input.

2. The method of claim 1, wherein receiving the sensor output includes receiving optical data output by one or more optical sensors disposed at the intersection between the two or more routes.

3. The method of claim 1, wherein receiving the sensor output includes receiving optical data output by one or more optical sensors disposed from the intersection between the two or more routes with a distance.

4. The method of claim 1, wherein the first vehicle and the second vehicle are a same type of vehicle.

5. The method of claim 1, wherein the first vehicle and the second vehicle are different types of vehicles.

6. The method of claim 1, wherein the movement of the one or more of the first vehicle or the second vehicle is changed autonomously by communicating the signal to the one or more of the first vehicle or the second vehicle.

7. The method of claim 1, wherein the sensor output that is received is received from one or more non-optical sensors.

8. A detection system comprising:
   a controller configured to
      receive sensor output indicative of one or more of a location, a heading, or a moving speed of one or more of a first vehicle or a second vehicle,
      predict a collision between the first vehicle and the second vehicle at an intersection between two or more routes based on the sensor output that is received by calculating a likelihood of collision using an artificial intelligence or machine learning model,
      communicating a signal to the one or more of the first vehicle or the second vehicle to change movement of the one or more of the first vehicle or the second vehicle, based on hierarchically-ranked alert levels corresponding to hierarchically ranked remedial activities, responsive to the collision that is predicted,
      receive an input of a result of changing the movement of the one or more of the first vehicle or the second vehicle that indicates whether a desirable outcome is achieved or not, wherein the desirable outcome comprises that the collision does not actually occur, and update the artificial intelligence or machine learning model based on the input.

9. The detection system of claim 8, wherein the controller is configured to receive the sensor output by receiving optical data output by one or more optical sensors disposed at the intersection between the two or more routes.

10. The detection system of claim 8, wherein the controller is configured to receive the sensor output by receiving optical data output by one or more optical sensors disposed from the intersection between the two or more routes with a distance.

11. The detection system of claim 8, wherein the first vehicle and the second vehicle are a same type of vehicle.

12. The detection system of claim 8, wherein the first vehicle and the second vehicle are different types of vehicles.

13. The detection system of claim 8, wherein the controller is configured to autonomously change the movement of the one or more of the first vehicle or the second vehicle by communicating the signal to the one or more of the first vehicle or the second vehicle.

14. The detection system of claim 8, wherein the controller is configured to receive the sensor output from one or more non-optical sensors.

15. A detection system comprising:
a controller configured to
receive sensor output indicative of one or more of a location, a heading, or a moving speed of a first vehicle and a second vehicle,
predict a collision between the first vehicle and the second vehicle at an intersection between two or more routes based on the sensor output that is received and using an artificial intelligence or machine learning model,
communicating a signal to the one or more of the first vehicle or the second vehicle to autonomously change movement of the one or more of the first vehicle or the second vehicle, based on hierarchically-ranked alert levels corresponding to hierarchically ranked remedial activities, responsive to the collision that is predicted,
receive an input of a result of changing the movement of the one or more of the first vehicle or the second vehicle that indicates whether a desirable outcome is achieved or not, wherein the desirable outcome comprises the collision does not actually occur, and
update the artificial intelligence or machine learning model based on the input.

16. The detection system of claim 15, wherein the controller is configured to receive the sensor output by receiving optical data output by one or more optical sensors disposed at the intersection between the two or more routes.

17. The detection system of claim 15, wherein the controller is configured to autonomously change the movement of the one or more of the first vehicle or the second vehicle by communicating the signal to the one or more of the first vehicle or the second vehicle.

18. The detection system of claim 15, wherein the controller is configured to receive the sensor output from one or more non-optical sensors.

* * * * *